United States Patent
Aida et al.

(10) Patent No.: US 11,418,070 B2
(45) Date of Patent: Aug. 16, 2022

(54) STATOR AND ROTARY ELECTRIC MACHINE

(71) Applicant: Mitsubishi Electric Corporation, Tokyo (JP)

(72) Inventors: Hiroshi Aida, Tokyo (JP); Saki Shimada, Tokyo (JP); Yoshihito Asao, Tokyo (JP); Satoru Akutsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 710 days.

(21) Appl. No.: 15/566,489

(22) PCT Filed: Apr. 15, 2015

(86) PCT No.: PCT/JP2015/061609
§ 371 (c)(1),
(2) Date: Oct. 13, 2017

(87) PCT Pub. No.: WO2016/166848
PCT Pub. Date: Oct. 20, 2016

(65) Prior Publication Data
US 2018/0102679 A1   Apr. 12, 2018

(51) Int. Cl.
*H02K 1/16*   (2006.01)
*H02K 3/28*   (2006.01)
(Continued)

(52) U.S. Cl.
CPC .............. *H02K 1/165* (2013.01); *H02K 3/12* (2013.01); *H02K 3/28* (2013.01); *H02K 15/085* (2013.01); *H02K 3/522* (2013.01); *H02K 15/0464* (2013.01)

(58) Field of Classification Search
CPC .......... H02K 1/16; H02K 3/28; H02K 15/085; H02K 3/12; H02K 3/522; H02K 15/0464
See application file for complete search history.

(56) References Cited

U.S. PATENT DOCUMENTS

| | | | | |
|---|---|---|---|---|
| 2015/0207374 A1* | 7/2015 | Tsuiki | ...................... | H02K 3/28 310/202 |
| 2015/0381001 A1* | 12/2015 | Tsuiki | ...................... | H02K 3/28 310/208 |
| 2017/0264157 A1* | 9/2017 | Koga | ...................... | H02K 1/16 |

FOREIGN PATENT DOCUMENTS

| JP | 3419721 B2 | 6/2003 |
|---|---|---|
| JP | 3613262 B2 | 1/2005 |

(Continued)

OTHER PUBLICATIONS

International Search Report of PCT/JP2015/061609 dated Jul. 7, 2015.

*Primary Examiner* — Bryan R Perez

(74) *Attorney, Agent, or Firm* — Sughrue Mion, PLLC; Richard C. Turner

(57) ABSTRACT

Phase coils include a first phase coil and a second phase coil, the phase coils are configured by connecting together end portions of the coil terminals of the first phase coil and the second phase coil that extend outward from identical radial positions in the slots axially outside the stator core so as to be radially outside a coil end group, and the coil terminals of the first phase coils of the phase coils of three phases include joint coil portions that extend outward from the slots within a pitch of one magnetic pole, are then bent so as to extend in an identical circumferential direction, and are placed in close proximity to the end portions of the coil terminals of the second phase coils that are intended for connection therewith.

7 Claims, 5 Drawing Sheets

(51) Int. Cl.
   *H02K 3/12*     (2006.01)
   *H02K 15/085*   (2006.01)
   *H02K 3/52*         (2006.01)
   *H02K 15/04*        (2006.01)

(56) References Cited

FOREIGN PATENT DOCUMENTS

| | | |
|---|---|---|
| JP | 2011-166945 A | 8/2011 |
| JP | 2012-055074 A | 3/2012 |
| WO | 2015/029579 A1 | 3/2015 |

\* cited by examiner

STATOR AND ROTARY ELECTRIC MACHINE

CROSS REFERENCE TO RELATED APPLICATIONS

This application is a National Stage of International Application No. PCT/JP2015/061609 filed Apr. 15, 2015, the contents of which are incorporated herein by reference in its entirety.

TECHNICAL FIELD

The present invention relates to a stator that has a stator winding that is constituted by a plurality of coil bodies that are produced by winding a conductor wire into distributed windings, and to a rotary electric machine that includes that stator.

BACKGROUND ART

In conventional rotary electric machines, a plurality of single-turn coils are produced by inserting a plurality of U-shaped coil segments from a first axial end of a stator core into respective pairs of slots that are three slots apart, and connecting together end portions of the coil segments that protrude outward at a second axial end of the stator core, and phase coils that have a plurality of turns are formed by connecting a plurality of the produced single-turn coils (see Patent Literature 1, for example).

Other conventional rotary electric machines include: a current-carrying member that includes a strip-shaped current-carrying portion, and that is formed by bending arm portions in a plate thickness direction of the strip-shaped current-carrying portion, the arm portions being integrated with the strip-shaped current-carrying portion and extending outward from this strip-shaped current-carrying portion so as to be approximately parallel to a longitudinal direction; an electrically insulating member that holds this current-carrying member; and a plurality of coils that are wound, wherein the coils are connected to the arm portions (see Patent Literature 2, for example).

CITATION LIST

Patent Literature

Patent Literature 1: Japanese Patent No. 3419721 (Gazette)
Patent Literature 2: Japanese Patent No. 3613262 (Gazette)

SUMMARY OF THE INVENTION

Problem to be Solved by the Invention

In the conventional rotary electric machine that is described in Patent Literature 1, phase coils are configured by circumferentially bending first coil segments that extend outward from a first position from an outer circumferential side inside slots, and joining them together with second coil segments that extend outward from the first position from the outer circumferential side inside slots that are three slots away. Thus, it is necessary to apply a bending process to the coil segments that are joined together. However, in the conventional rotary electric machine that is described in Patent Literature 1, because the coil segments that extend outward from the first position from the outer circumferential side inside the slots that are three slots apart and are joined together in each of the phase coils are separated from each other circumferentially, and a bending process must be applied to the coil segments for each phase, one problem has been that a large number of bending processes is required, reducing productivity.

In the conventional rotary electric machine that is described in Patent Literature 2, because the phase coils are produced by connecting the plurality of coils to the arm portions of the current-carrying members that are held by the electrically insulating member, which is positioned axially outside a coil end group, one problem has been that axial length of a stator is longer, making vibration resistance deteriorate.

The present invention aims to solve the above problems and an object of the present invention is to provide a stator and a rotary electric machine that includes that stator that enables joint coil portions for configuring a plurality of phase coils to be bent simultaneously in a single step to enable productivity to be improved, and that shortens axial length of a stator to enable vibration resistance to be improved, by making the joint coil portions of the plurality of phase coils emerge from an outermost position or an innermost position inside slots within a pitch of one magnetic pole and extend in an identical circumferential direction.

Means for Solving the Problem

A stator according to the present invention includes: an annular stator core in which slots are arranged circumferentially; and a three-phase winding that includes coil bodies that are each produced by winding a conductor wire into a distributed winding, the coil bodies being mounted to the stator core at a pitch of one slot so as to be equal in number to a total number of the slots. The coil bodies are prepared such that a first coil terminal and a second coil terminal of the conductor wire that is wound into the distributed winding protrude outward at a first axial end of the stator core, each of three phase coils that constitute the three-phase winding includes a first phase coil and a second phase coil, and the first phase coil and the second phase coil are each configured by connecting in series in order of circumferential arrangement a group of the coil bodies that are arranged alternately in a circumferential direction among a plurality of the coil bodies that constitute an identical phase coil by connecting the first coil terminal of one coil body and the second coil terminal of another coil body. The phase coils are configured by connecting together end portions of the coil terminals of the first phase coil and the second phase coil that extend outward from identical radial positions in the slots axially outside the stator core so as to be radially outside a coil end group or axially outside the stator core so as to be radially inside the coil end group, and the coil terminals of the first phase coils of the three phase coils that constitute the three-phase winding include joint coil portions that extend outward from the slots within a pitch of one magnetic pole, are then bent so as to extend in an identical circumferential direction, and are placed in close proximity to the end portions of the coil terminals of the second phase coils that are intended for connection therewith.

Effects of the Invention

According to the present invention, phase coils are configured by connecting together end portions of coil terminals of a first phase coil and a second phase coil that extend outward from identical radial positions in slots axially outside a stator core so as to be radially outside a coil end group or axially outside the stator core so as to be radially inside the coil end group. Thus, connecting portions between the end portions of the coil terminals are positioned inside an end surface of the stator core when viewed from an axial direction, and do not interfere with a case or a rotor. Furthermore, because the connecting portions between the end portions of the coil terminals do not protrude axially further outward than apex portions of the coil end group when viewed from a radial direction, axial length of the stator can be shortened, and vibration resistance is also improved.

The coil terminals of the first phase coils of the three phase coils that constitute a three-phase winding include joint coil portions that extend outward from the slots within a pitch of one magnetic pole, are then bent so as to extend in an identical circumferential direction, and are placed in close proximity to end portions of coil terminals of the second phase coils that are intended for connection therewith. Thus, because steps of bending the joint coil portions of the three phase coils can be performed simultaneously in a single step, the number of bending steps for the joint coil portions is reduced significantly, improving productivity of the stator.

DESCRIPTION OF EMBODIMENTS

Embodiment 1

Figure 1:
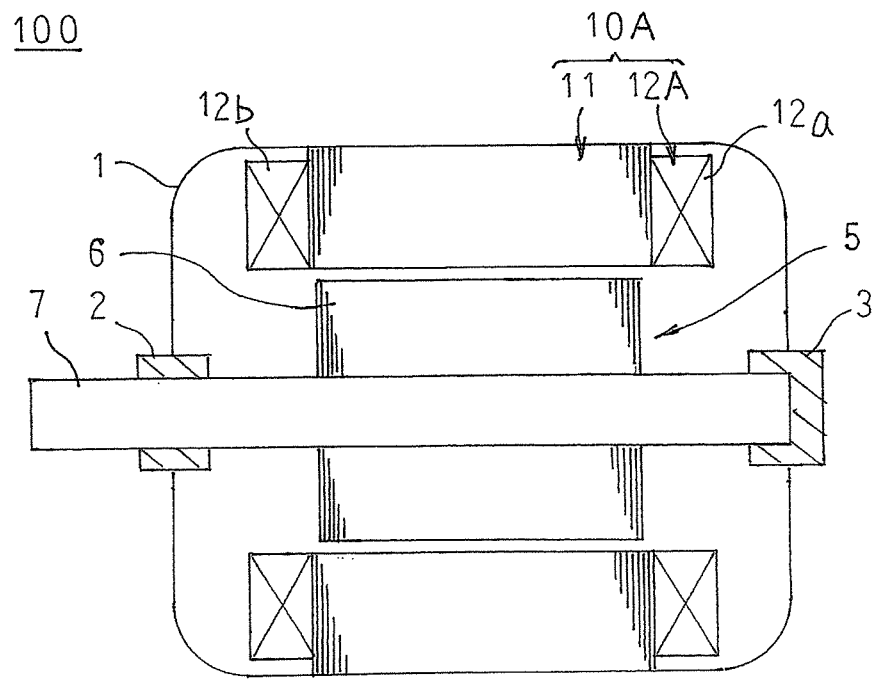
FIG. 1 is a cross section that schematically shows a configuration of a rotary electric machine according to Embodiment 1 of the present invention.
Figure 2:
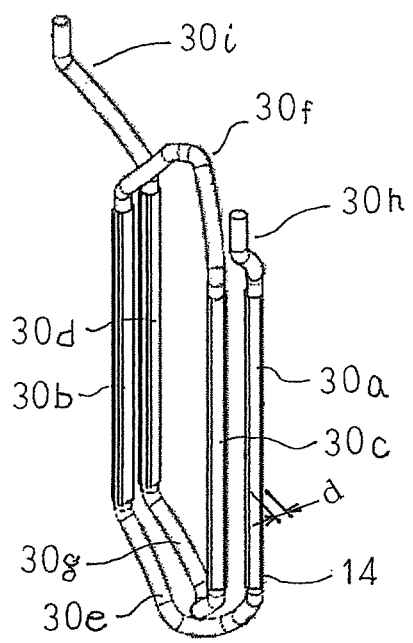
FIG. 2 is an oblique projection that shows a coil body that constitutes part of a stator winding in the rotary electric machine according to Embodiment 1.
Figure 3:
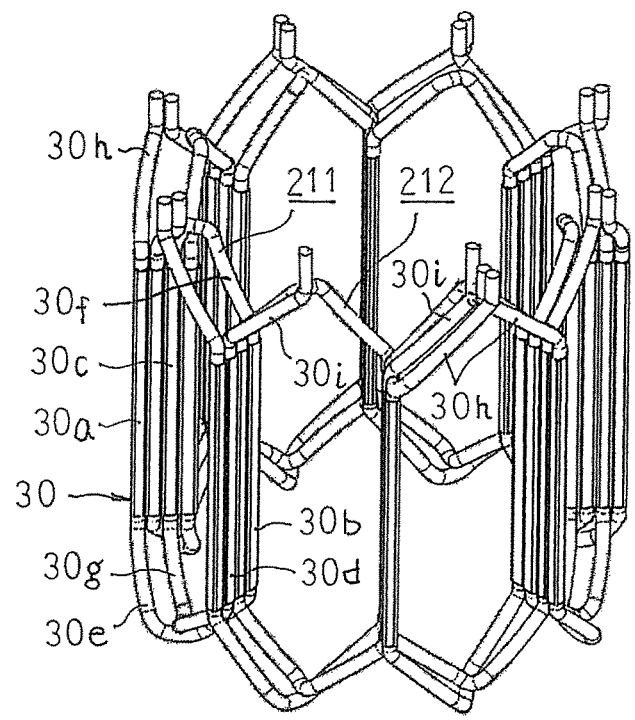
FIG. 3 is an oblique projection that shows a phase coil of the stator winding in the rotary electric machine according to Embodiment 1.
Figure 4:
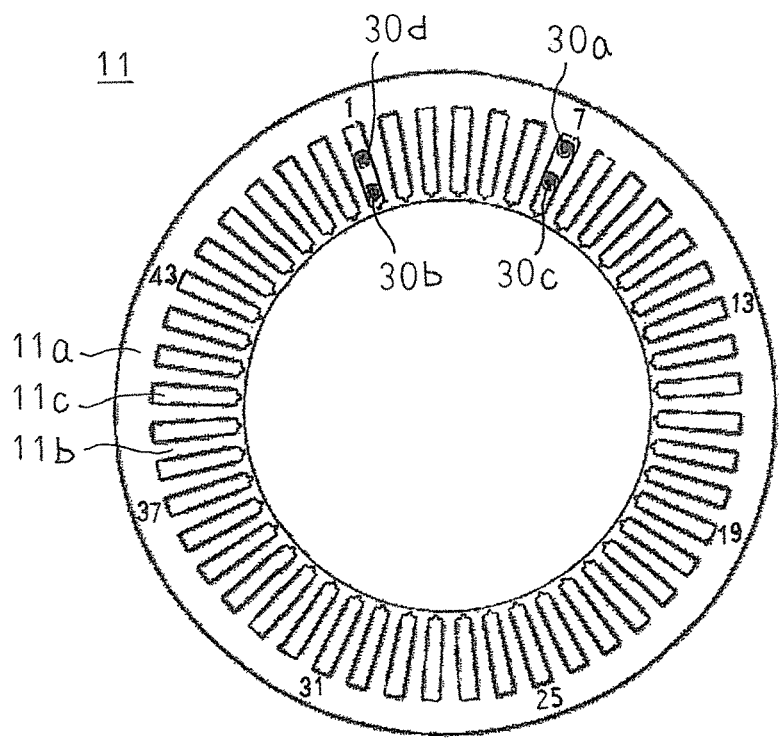
FIG. 4 is an end elevation that shows a state in which a single coil body is mounted to a stator core in the rotary electric machine according to Embodiment 1.
Figure 5:
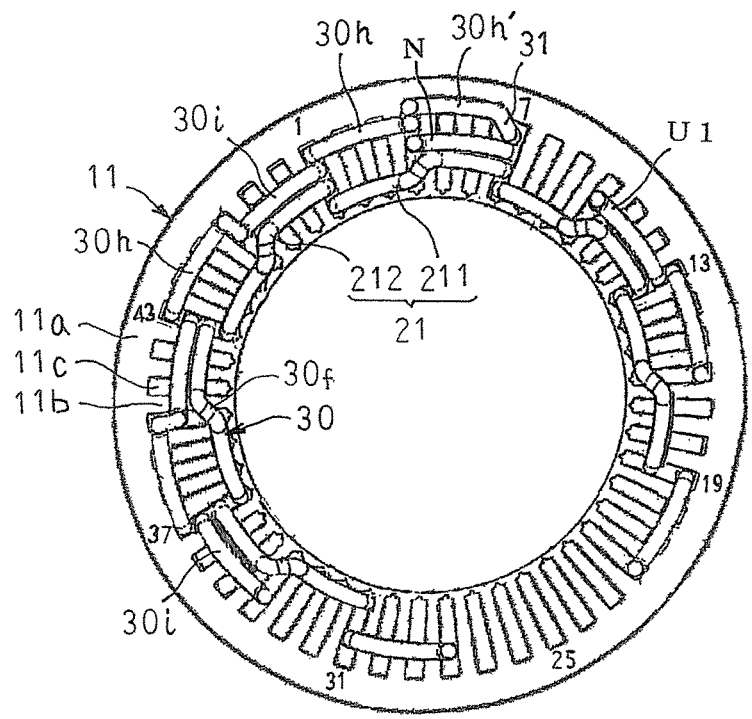
FIG. 5 is an end elevation that explains a method for connecting a first U1-phase coil and a second U1-phase coil in the rotary electric machine according to Embodiment 1.
Figure 6:
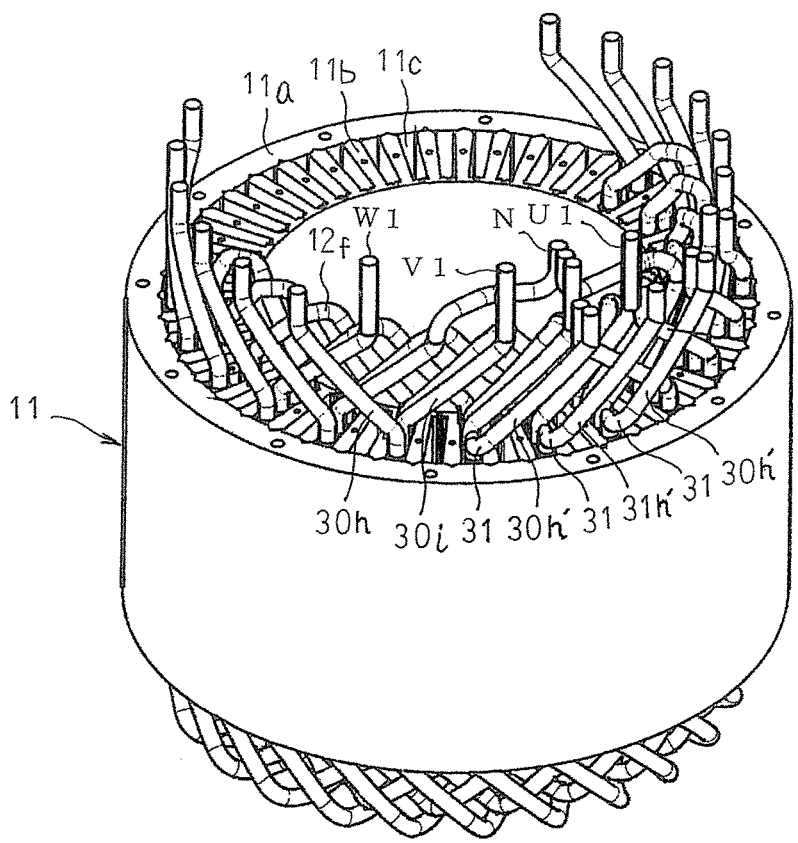
FIG. 6 is an oblique projection that shows part of a first three-phase alternating-current winding in the rotary electric machine according to Embodiment 1.
Figure 7:
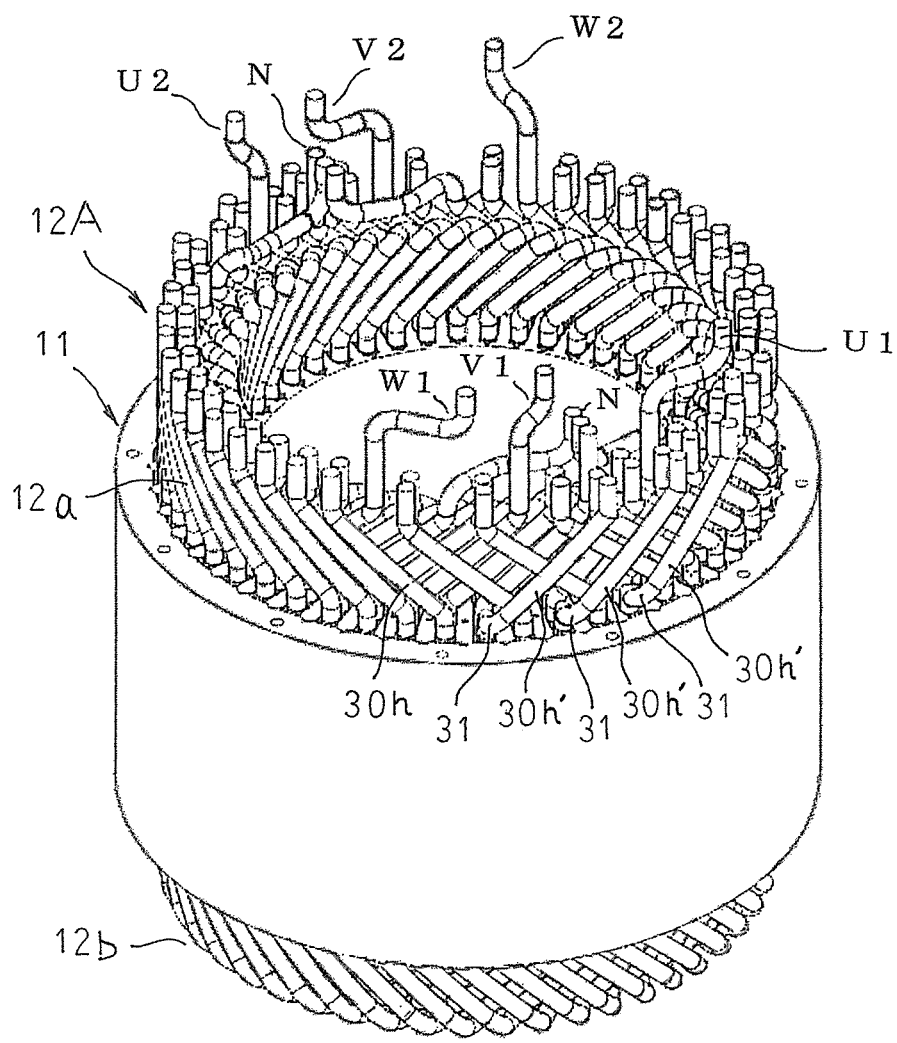
FIG. 7 is an oblique projection that shows a stator according to Embodiment 1 of the present invention.

FIG. 1 is a cross section that schematically shows a configuration of a rotary electric machine according to Embodiment 1 of the present invention, FIG. 2 is an oblique projection that shows a coil body that constitutes part of a stator winding in the rotary electric machine according to Embodiment 1, FIG. 3 is an oblique projection that shows a phase coil of the stator winding in the rotary electric machine according to Embodiment 1, FIG. 4 is an end elevation that shows a state in which a single coil body is mounted to a stator core in the rotary electric machine according to Embodiment 1, FIG. 5 is an end elevation that shows a state before connecting a first U1-phase coil and a second U1-phase coil in the rotary electric machine according to Embodiment 1, FIG. 6 is an oblique projection that shows part of a stator in the rotary electric machine according to Embodiment 1, and FIG. 7 is an oblique projection that shows the stator according to Embodiment 1 of the present invention. In FIGS. 4 and 5, 1, 7, etc., through 43 are slot numbers that have been allotted for convenience to the slots in order of circumferential arrangement. Furthermore, only first through fourth rectilinear portions of a coil body are shown in FIG. 4. Furthermore, in FIG. 5, some of the coil bodies have been omitted for simplicity.

In FIG. 1, a rotary electric machine 100 includes: a rotor 5 that is rotatably disposed inside a case 1; and a stator 10A that is held by the case 1 so as to be disposed coaxially with the rotor 5 so as to surround the rotor 5.

The rotor 5 includes: a rotor core 6; and a rotating shaft 7 that is inserted so as to pass through a central position of the rotor core 6 and that is fixed to the rotor core 6. The rotor 5 is disposed inside the case 1 such that the rotating shaft 7 is supported by bearings 2 and 3 that are held by the case 1.

The stator 10A includes: a stator core 11 that is produced by laminating electromagnetic steel sheets; and a stator winding 12A that is mounted to the stator core 11. As shown in FIG. 4, the stator core 11 includes: an annular core back 11a; and forty-eight teeth 11b that each protrude radially inward from an inner wall surface of the core back 11a, and that are arranged at a uniform angular pitch circumferentially. Spaces that are surrounded by the core back 11a and two teeth 11b that are circumferentially adjacent constitute slots 11c.

The stator winding 12A includes a plurality of coil bodies 30. As shown in FIG. 2, the coil bodies 30 are coil bodies that are both distributed windings and lap windings that are produced by winding a conductor wire 14 for two turns concentrically so as to have an approximate hexagonal shape, and include: first through fourth rectilinear portions 30a, 30b, 30c, and 30d that are arranged in two rows so as to be separated by an angular pitch of six slots; a first coil terminal 30h that extends outward from a first end of the first rectilinear portion 30a; a first coil end 30e that links together second ends of the first rectilinear portion 30a and the second rectilinear portion 30b; a second coil end 30f that links together first ends of the second rectilinear portion 30b and the third rectilinear portion 30c; a third coil end 30g that links together second ends of the third rectilinear portion 30c and the fourth rectilinear portion 30d; and a second coil terminal 30i that extends outward from the first end of the fourth rectilinear portion 30d. Here, an angular spacing of six slots is a pitch between slot centers of slots 11c that are positioned on two sides of six circumferentially consecutive teeth 11b, and in this case corresponds to a pitch of one magnetic pole.

As shown in FIG. 4, the first and third rectilinear portions 30a and 30c are housed in the fourth layer and the second layer inside the slot 11c at Slot Number 7, and the second and fourth rectilinear portions 30b and 30d are housed in the first layer and the third layer inside the slot 11c at Slot Number 1. Moreover, radial positions inside the slots 11c in which the first through fourth rectilinear portions 30a, 30b, 30c, and 30d are housed are designated the first layer, the second layer, the third layer, and the fourth layer from a radially inner side outward.

The first coil end 30e has: an apex portion at a central portion between the columns of first through fourth rectilinear portions 30a, 30b, 30c, and 30d; and a pair of inclined portions that link the apex portion and the second ends of the first and second rectilinear portions 30a and 30b. The pair of inclined portions are displaced by the apex portion by approximately 3 d in a radial direction. Moreover, d is a radial thickness of the conductor wire 14 when the coil bodies 30 are mounted into the pairs of slots 11c.

Similarly, the second coil end 30f has: an apex portion at a central portion between the columns of first through fourth rectilinear portions 30a, 30b, 30c, and 30d; and a pair of inclined portions that link the apex portion and the first ends of the second and third rectilinear portions 30b and 30c. The pair of inclined portions are displaced by the apex portion by approximately d in a radial direction.

Similarly, the third coil end 30g has: an apex portion at a central portion between the columns of first through fourth rectilinear portions 30a, 30b, 30c, and 30d; and a pair of inclined portions that link the apex portion and the second ends of the third and fourth rectilinear portions 30c and 30d. The pair of inclined portions are displaced by the apex portion by approximately d in a radial direction.

The first coil terminal 30h includes: an inclined portion that extends outward from the first end of the first rectilinear portion 30a at an angle of inclination that is approximately equal to the inclined portion that extends outward from the first end of the third rectilinear portion 30c, but in an opposite direction; and an end portion that extends axially from a tip of the inclined portion. The second coil terminal 30i includes: an inclined portion that extends outward from the first end of the fourth rectilinear portion 30d at an angle of inclination that is approximately equal to the inclined portion that extends outward from the first end of the second rectilinear portion 30b, but in an opposite direction; and an end portion that extends axially from a tip of the inclined portion. Here, an axial direction is a direction that is parallel to the longitudinal direction of the first rectilinear portion 30a.

Forty-eight coil bodies 30 that are configured in this manner are arranged circumferentially at a pitch of one slot so as to each be housed in a pair of slots 11c that are separated by an angular spacing of six slots. The first through fourth rectilinear portions 30a, 30b, 30c, and 30d are housed in each of the slots 11c so as to line up in single columns in a radial direction. A U1-phase coil 21 is constituted by eight coil bodies 30 that are mounted into a group of slots 11c at Slot Numbers (1+6 n). Moreover, n is a natural number (including 0).

Next, connections among the coil bodies 30 that constitute the U1-phase coil 21 will be explained with reference to FIGS. 3, 5, and 6.

The end portion of the second coil terminal 30i of the coil body 30 that is housed in the pair of slots 11c at Slot Numbers 1 and 7 lines up radially so as to be in contact with the end portion of the first coil terminal 30h of the coil body 30 that is housed in the pair of slots 11c at Slot Numbers 37 and 43. Then, the two coil bodies 30 are connected by joining together the end portions of the first and second coil terminals 30h and 30i by tungsten inert gas (TIG) welding, etc. In this manner, a first U1-phase coil 211 is formed in which four coil bodies 30 are connected in series, the four coil bodies 30 being housed in the pair of slots 11c at Slot Numbers 1 and 7, the pair of slots 11c at Slot Numbers 37 and 43, the pair of slots 11c at Slot Numbers 25 and 31, and the pair of slots 11c at Slot Numbers 13 and 19. In other words, the first U1-phase coil 211 is configured by connecting in series in order of circumferential arrangement a group including every alternate coil body 30 among the eight coil bodies 30 that are mounted to the group of slots 11c at Slot Numbers (1+6 n).

Similarly, a second U1-phase coil 212 is formed in which four coil bodies 30 are connected in series, the four coil bodies 30 being housed in the pair of slots 11c at Slot Numbers 43 and 1, the pair of slots 11c at Slot Numbers 31 and 37, the pair of slots 11c at Slot Numbers 19 and 25, and the pair of slots 11c at Slot Numbers 7 and 13. In other words, the second U1-phase coil 212 is configured by connecting in series in order of circumferential arrangement a group including every remaining alternate coil body 30 among the eight coil bodies 30 that are mounted to the group of slots 11c at Slot Numbers (1+6 n).

The first and second U1-phase coils 211 and 212, which are each formed by connecting four coil bodies 30 in series, are configured in this manner. Then, as shown in FIG. 3, a portion (hereinafter "joint coil portion 30h'") of the first coil terminal 30h of the coil body 30 that is positioned at an end portion of the first U1-phase coil 211 that extends outward from the slot 11c at Slot Number 7 is bent to form a bent portion 31, and to displace the inclined portion radially outward. In addition, the inclined portion of the joint coil portion 30h' that extends outward from the slot 11c at Slot Number 7 is extended in an identical direction at an angle of inclination that is approximately equal to the inclined portion that extends outward from the first end of the third rectilinear portion 30c. The end portion of the joint coil portion 30h' that extends outward from the slot 11c at Slot Number 7 thereby lines up radially so as to be in contact with an end portion of the first coil terminal 30h of the coil body 30 that is positioned at the end portion of the second U1-phase coil 212 that extends outward from the slot 11c at Slot Number 1. Then, the end portions of the joint coil portion 30h' and the first coil terminal 30h are connected by tungsten inert gas (TIG) welding, etc. A U1-phase coil 21 in which the eight coil bodies 30 that are mounted into the group of slots 11c at Slot Numbers (1+6n) are connected in series is configured thereby. One of the second coil terminals 30i that extend outward from Slot Numbers 7 and 13 of the coil bodies 30 that are positioned at the two ends of the U1-phase coil 21 becomes a U1-phase output wire U1, and the other becomes a neutral-point connection terminal N.

Here, the joint coil portion 30h' of the first U1-phase coil 211 and the first coil terminal 30h that constitutes the coil terminal of the second U1-phase coil 212 each extend outward from the fourth layer inside the slots 11c. Thus, the bent portion 31 is formed on a portion of the joint coil portion 30h' that extends outward from the slots 11c that is bent in a reverse direction to displace the inclined portion radially outward. The joint coil portion 30h' that is bent in the reverse direction thereby extends in a circumferential direction axially outside the core back 11a such that the inclined portion thereof does not interfere with the inclined portions of the other first coil terminals 30h, and is connected to the end portion of the first coil terminal 30h that is intended for connection therewith.

Moreover, a U2-phase coil is formed by eight coil bodies 30 that are mounted into a group of slots 11c at Slot Numbers (2+6 n). A V1-phase coil is formed by eight coil bodies 30 that are mounted into a group of slots 11c at Slot Numbers (3+6 n). A V2-phase coil is formed by eight coil bodies 30 that are mounted into a group of slots 11c at Slot Numbers (4+6 n). A W1-phase coil is formed by eight coil bodies 30 that are mounted into a group of slots 11c at Slot Numbers (5+6 n). A W2-phase coil is formed by eight coil bodies 30 that are mounted into a group of slots 11c at Slot Numbers (6+6 n). Because the U2-phase coil, the V1-phase coil, the V2-phase coil, the W1-phase coil, and the W2-phase coil are each also formed by connecting eight coil bodies 30 in a similar or identical manner to the U1-phase coil 21, explanation thereof will be omitted.

Here, as shown in FIG. 6, the joint coil portions 30h' of the first phase coils of the U1-phase coil, the V1-phase coil, and the W1-phase coil are extended outward from three slots 11c within a pitch of one magnetic pole, are placed in close proximity to each other, are extended in an identical circumferential direction, and are joined together with respective first coil terminals 30h of second phase coils that are intended for connection therewith. The second coil terminals 30i of the second phase coils, which constitute neutral-point connection terminals of the U1-phase coil, the V1-phase coil, and the W1-phase coil, are also joined together. The U1-phase coil, the V1-phase coil, and the W1-phase coil are thereby wye-connected to form a first three-phase alternating-current winding.

Although not shown, the U2-phase coil, the V2-phase coil, and the W2-phase coil are similarly wye-connected to form a second three-phase alternating-current winding. As shown in FIG. 7, the stator winding 12A is constituted by the first three-phase alternating-current winding and the second three-phase alternating-current winding.

In the stator 10A that is configured in this manner, portions of the conductor wire 14 that are formed by linking the first coil terminals 30h and the second coil terminals 30i, and the second coil ends 30f, are arranged at a first axial end of the stator core 11 circumferentially at a pitch of one slot so as to line up radially to constitute a first coil end group 12a. The first coil ends 30e and the third coil ends 30g are arranged at a second axial end of the stator core 11 circumferentially at a pitch of one slot so as to line up radially to constitute a second coil end group 12b.

In Embodiment 1, coil bodies 30 that are distributed windings and lap windings are disposed in a stator core 11 at a pitch of one slot so as to be equal in number to a total number of slots 11c. Respective phase coils include a first phase coil and a second phase coil that are each formed by connecting in series in order of circumferential arrangement a group of circumferentially alternate coil bodies 30 among a group of same-phase coil bodies 30, such that a first coil terminal 30h of a first coil body 30 and a second coil terminal 30i of a second coil body 30 are connected. In addition, the phase coils are configured by connecting a joint coil portion 30h' of the first phase coil directly to a first coil terminal 30h that constitutes a coil terminal of the second phase coil. The joint coil portions 30h' and the connecting portions between the end portions of the first coil terminals 30h are positioned axially outside the stator core 11 so as to be radially outside a first coil end group 12a.

Consequently, the joint coil portions 30h' and the connecting portions between the end portions of the first coil terminals 30h are positioned inside the end surface of the stator core 11 when viewed from an axial direction, and do not interfere with the case 1. Because the joint coil portions 30h' and the connecting portions between the end portions of the first coil terminals 30h are positioned so as to be radially outside a first coil end group 12a, the joint coil portions 30h' and the connecting portions between the end portions of the first coil terminals 30h do not protrude axially outward from the apex portions of the first coil end group 12a. In other words, axial heights of the joint coil portions 30h' and the connecting portions between the end portions of the first coil terminals 30h are less than or equal to an axial height of the first coil end group 12a. Thus, because an axial length of the stator 10A is shorter, an axial length of the rotary electric machine 100 can be shortened, enabling the vibration resistance to be improved. In addition, because lengths of the conductor wires 14 are shorter, electrical resistance in the stator winding 12A can be reduced.

In addition, the joint coil portions 30h' of the U1-phase coil, the V1-phase coil, and the W1-phase coil are extended outward from slots 11c within a pitch of one magnetic pole, are then placed in close proximity to each other, are extended in an identical circumferential direction, and are formed so as to be in close proximity to first coil terminals 30h that are intended for connection therewith. Thus, bending processes for the three joint coil portions 30h' can be performed simultaneously in a single step. Similarly, the joint coil portions 30h' of the U2-phase coil, the V2-phase coil, and the W2-phase coil are extended outward from slots 11c within a pitch of one magnetic pole, are then placed in close proximity to each other, are extended in an identical circumferential direction, and are formed so as to be in close proximity to first coil terminals 30h that are intended for connection therewith. Thus, bending processes for the three joint coil portions 30h' can be performed simultaneously in a single step.

Consequently, the number of bending steps for the joint coil portions 30h' is reduced significantly, improving productivity of the stator 10A.

Because the joint coil portions 30h' extend in an opposite circumferential direction to other first coil terminals 30h, radial overlap between the joint coil portions 30h' and the other first coil terminals 30h is reduced, improving electrical insulation.

Because bent portions 31 are formed on portions of the joint coil portions 30h' that extend outward from the slots 11c to displace inclined portions radially outward, the joint coil portions 30h' can be connected to the coil terminals 30h that are intended for connection therewith without interfering with other coil bodies 30, improving connection workability.

Embodiment 2

Figure 8:
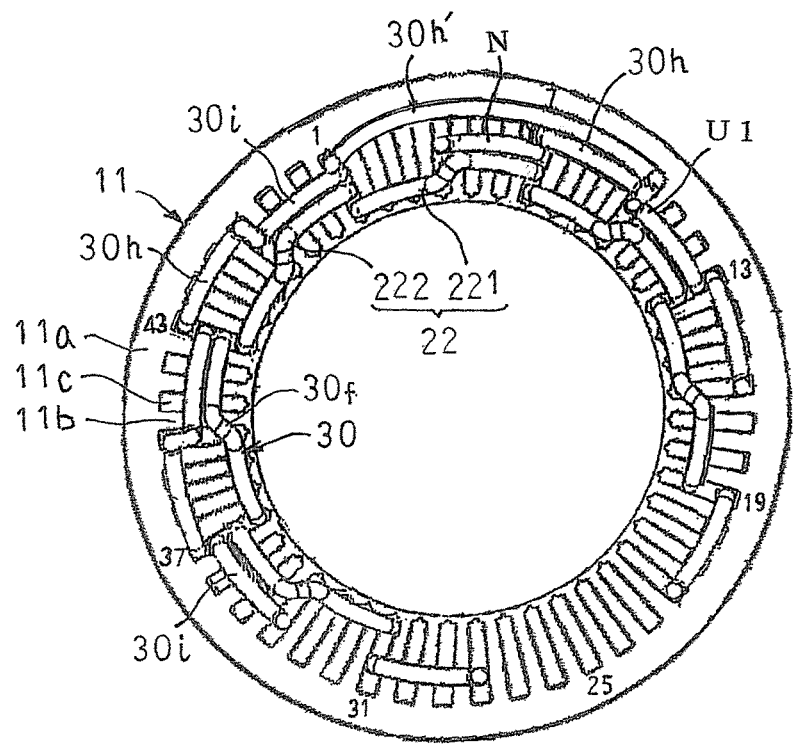
FIG. 8 is an end elevation that explains a method for connecting a first U1-phase coil and a second U1-phase coil in a rotary electric machine according to Embodiment 2.
Figure 9:
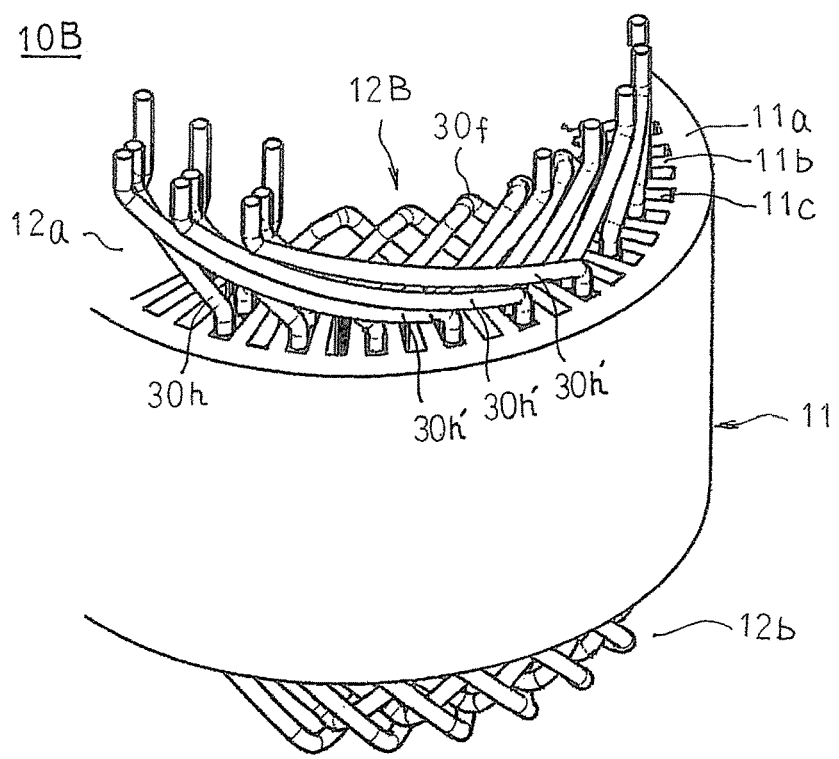
FIG. 9 is an oblique projection that shows part of a first three-phase alternating-current winding in the rotary electric machine according to Embodiment 2.

FIG. 8 is an end elevation that explains a method for connecting a first U1-phase coil and a second U1-phase coil in a rotary electric machine according to Embodiment 2, and FIG. 9 is an oblique projection that shows part of a first three-phase alternating-current winding in the rotary electric machine according to Embodiment 2. In FIG. 8, 1, 7, etc., through 43 are slot numbers that have been allotted for convenience to the slots in order of circumferential arrangement. Furthermore, in FIG. 8, some of the coil bodies have been omitted for simplicity.

In a stator according to Embodiment 2, forty-eight coil bodies 30 are also arranged circumferentially at a pitch of one slot so as to each be housed in a pair of slots 11c that are separated by an angular spacing of six slots. The first through fourth rectilinear portions 30a, 30b, 30c, and 30d are housed in each of the slots 11c so as to line up in single columns in a radial direction. A U1-phase coil 22 is constituted by eight coil bodies 30 that are mounted into a group of slots 11c at Slot Numbers (1+6 n).

Next, connections among the coil bodies 30 that constitute the U1-phase coil 22 will be explained with reference to FIGS. 8 and 9.

The end portion of the second coil terminal 30i of the coil body 30 that is housed in the pair of slots 11c at Slot Numbers 1 and 7 lines up radially so as to be in contact with the end portion of the first coil terminal 30*h* of the coil body 30 that is housed in the pair of slots 11*c* at Slot Numbers 37 and 43. Then, the two coil bodies 30 are connected by joining together the end portions of the first and second coil terminals 30*h* and 30*i* by tungsten inert gas (TIG) welding, etc. In this manner, a first U1-phase coil 221 is formed in which four coil bodies 30 are connected in series, the four coil bodies 30 being housed in the pair of slots 11*c* at Slot Numbers 1 and 7, the pair of slots 11*c* at Slot Numbers 37 and 43, the pair of slots 11*c* at Slot Numbers 25 and 31, and the pair of slots 11*c* at Slot Numbers 13 and 19. In other words, the first U1-phase coil 221 is configured by connecting in series in order of circumferential arrangement a group including every second coil body 30 among the eight coil bodies 30 that are mounted to the group of slots 11*c* at Slot Numbers (1+6 n).

Similarly, a second U1-phase coil 222 is formed in which four coil bodies 30 are connected in series, the four coil bodies 30 being housed in the pair of slots 11*c* at Slot Numbers 43 and 1, the pair of slots 11*c* at Slot Numbers 31 and 37, the pair of slots 11*c* at Slot Numbers 19 and 25, and the pair of slots 11*c* at Slot Numbers 7 and 13. In other words, the second U1-phase coil 222 is configured by connecting in series in order of circumferential arrangement a group including every remaining second coil body 30 among the eight coil bodies 30 that are mounted to the group of slots 11*c* at Slot Numbers (1+6 n).

The first and second U1-phase coils 221 and 222, which are each formed by connecting four coil bodies 30 in series, are configured in this manner. A joint coil portion 30*h*' of the coil body 30 that is positioned at an end portion of the second U1-phase coil 222 extends outward from the slot 11*c* at Slot Number 1, extends circumferentially, and lines up radially so as to be in contact with an end portion of the first coil terminal 30*h* of the coil body 30 that is positioned at the end portion of the first U1-phase coil 221 that extends outward from the slot 11*c* at Slot Number 7. Then, the end portions of the joint coil portion 30*h*' and the first coil terminal 30*h* are connected by tungsten inert gas (TIG) welding, etc. A U1-phase coil 22 in which the eight coil bodies 30 that are mounted into the group of slots 11*c* at Slot Numbers (1+6n) are connected in series is configured thereby. One of the second coil terminals 30*i* that extend outward from Slot Numbers 7 and 13 of the coil bodies 30 that are positioned at the two ends of the U1-phase coil 22 becomes a U1-phase output wire U1, and the other becomes a neutral-point connection terminal N.

Here, when viewed from axially outside, as shown in FIG. 8, the joint coil portion 30*h*' of the second U1-phase coil 222 is formed so as to extend outward from the fourth layer inside the slot 11*c*, and then extend in a circumferential direction while avoiding the first coil terminals 30*h* of the other coil bodies 30, and contact the first coil terminal 30*h* that is intended for connection therewith in the shortest distance. In the present invention, the joint coil portion 30*h*' that extends outward from the slots 11*c* extending so as to contact the first coil terminal 30*h* that is intended for connection therewith in the shortest distance while avoiding the other coil bodies 30 in this manner is expressed as "extending rectilinearly in a circumferential direction while avoiding the other coil bodies 30".

Moreover, a U2-phase coil is formed by eight coil bodies 30 that are mounted into a group of slots 11*c* at Slot Numbers (2+6 n). A V1-phase coil is formed by eight coil bodies 30 that are mounted into a group of slots 11*c* at Slot Numbers (3+6 n). A V2-phase coil is formed by eight coil bodies 30 that are mounted into a group of slots 11*c* at Slot Numbers (4+6 n). A W1-phase coil is formed by eight coil bodies 30 that are mounted into a group of slots 11*c* at Slot Numbers (5+6 n). A W2-phase coil is formed by eight coil bodies 30 that are mounted into a group of slots 11*c* at Slot Numbers (6+6 n). The U2-phase coil, the V1-phase coil, the V2-phase coil, the W1-phase coil, and the W2-phase coil are each also formed by connecting eight coil bodies 30 in a similar or identical manner to the U1-phase coil 22.

Here, as shown in FIG. 9, the joint coil portions 30*h*' of the second phase coils of the U1-phase coil, the V1-phase coil, and the W1-phase coil are extended outward from three slots 11*c* within a pitch of one magnetic pole, are placed in close proximity to each other, are extended in an identical circumferential direction, and are joined together with respective first coil terminals 30*h* of first phase coils that are intended for connection therewith. The second coil terminals 30*i* of the second phase coils, which constitute neutral-point connection terminals of the U1-phase coil, the V1-phase coil, and the W1-phase coil, are also joined together. The U1-phase coil, the V1-phase coil, and the W1-phase coil are thereby wye-connected to form a first three-phase alternating-current winding.

Although not shown, the U2-phase coil, the V2-phase coil, and the W2-phase coil are similarly wye-connected to form a second three-phase alternating-current winding. The stator winding 12B is constituted by the first three-phase alternating-current winding and the second three-phase alternating-current winding.

In a stator 10B that is configured in this manner, portions of the conductor wire 14 that are formed by linking the first coil terminals 30*h* and the second coil terminals 30*i* and the second coil ends 30*f* are arranged at a first axial end of the stator core 11 circumferentially at a pitch of one slot so as to line up radially to constitute a first coil end group 12*a*. The first coil ends 30*e* and the third coil ends 30*g* are arranged at a second axial end of the stator core 11 circumferentially at a pitch of one slot so as to line up radially to constitute a second coil end group 12*b*. The joint coil portions 30*h*' and the connecting portions between the end portions of the first coil terminals 30*h* are positioned axially outside the stator core 11 so as to be radially outside a first coil end group 12*a*.

In this manner, Embodiment 2 is configured in a similar or identical manner to Embodiment 1 above except that the connecting method for the coil bodies 30 and the wiring method for the joint coil portions 30*h*' are different. Consequently, similar or identical effects to those of Embodiment 1 above can also be achieved in Embodiment 2.

According to Embodiment 2, joint coil portions 30*h*' of second phase coils extend outward from the slots 11*c*, and then extend in an identical circumferential direction to other first coil terminals 30*h*, and are connected to the first coil terminals 30*h* of the first phase coils that are intended for connection therewith. Consequently, the first coil terminals 30*h* of forty-eight coil bodies 30 that are mounted to the stator core 11 have identical shapes, and second coil terminals 30*i* thereof have identical shapes, improving workability of assembly and connection of the coil bodies 30.

Because the joint coil portions 30*h*' extend outward from the slots 11*c*, and then extend rectilinearly in a circumferential direction, and are connected to the first coil terminals 30*h* that are intended for connection therewith, the joint coil portions 30*h*' can be connected to the first coil terminals 30*h* that are intended for connection therewith in the shortest distance, enabling the lengths of the conductor wires 14 to be shortened, thereby enabling the electrical resistance of the stator winding 12B to be reduced.

Moreover, in Embodiment 2 above, joint coil portions extend outward from slots, and then extend rectilinearly in a circumferential direction, and are connected to first coil terminals that are intended for connection therewith, but bent portions may be formed on portions of the joint coil portions that extend outward from the slots in a similar or identical manner to Embodiment 1 above.

In each of the above embodiments, a stator core on which forty-eight slots are disposed is used, but the total number of slots is not limited to forty-eight. Furthermore, the slots are formed at a ratio of two slots per phase per pole, but the number of slots per phase per pole is not limited to two, and may be one, or may be three or greater. The number of slots per phase per pole was two, and the spacing between the slots into which the rectilinear portions of the coil bodies are inserted was an angular pitch of six slots (a pitch of one magnetic pole), but if the number of slots per phase per pole is one, spacing between the slots into which the rectilinear portions of the coil bodies are inserted is an angular pitch of three slots (a pitch of one magnetic pole).

In each of the above embodiments, coil bodies are configured into full-pitch windings, but coil bodies may be configured into short-pitch windings or long-pitch windings. In other words, spacing between slots into which the rectilinear portions of the coil bodies are inserted is not limited to an angular spacing of six slots (a pitch of one magnetic pole).

In each of the above embodiments, first and second three-phase alternating-current windings that constitute a stator winding are produced by wye-connecting a U-phase coil, a V-phase coil, and a W-phase coil, but first and second three-phase alternating-current windings may be produced by delta-connecting a U-phase coil, a V-phase coil, and a W-phase coil.

In each of the above embodiments, first rectilinear portions of coil bodies are housed in a fourth layer inside slots, but first rectilinear portions of coil bodies may be housed in a first layer inside slots. In that case, the joint coil portions extend in a circumferential direction axially outside the stator core on an inner circumferential side of a coil end group, and are connected to first coil terminals that are intended for connection therewith. Provided that the first rectilinear portions are housed in the first layer or the fourth layer inside the slots, radial positions of the second, third, and fourth rectilinear portions inside the slots can be selected appropriately depending on the winding method for the conductor wires that constitute the coil bodies.

In each of the above embodiments, coil bodies are produced by winding a conductor wire for two turns concentrically, but the number of turns of the conductor wire is not limited to two turns.

In each of the above embodiments, coil bodies are coil bodies that are distributed windings and lap windings that are produced by winding a conductor wire concentrically, but the coil bodies are not limited to being coil bodies that are distributed windings and lap windings, and may be coil bodies in which a conductor wire is wound into a distributed winding, or may be U-shaped coil segments, provided that they are disposed at a pitch of one slot so as to be equal in number to the total number of slots in the stator core.

The invention claimed is:

1. A stator comprising: an annular stator core in which slots are arranged circumferentially; and a three-phase winding that comprises coil bodies that are each produced by winding a conductor wire into a distributed winding, said coil bodies being mounted to said stator core at a pitch of one slot so as to be equal in number to a total number of said slots, wherein: said coil bodies are prepared such that a first coil terminal and a second coil terminal of said conductor wire that is wound into said distributed winding protrude outward at a first axial end of said stator core; each of three winding phase coils that constitute said three-phase winding comprises a first phase coil and a second phase coil; said first phase coil and said second phase coil are each configured by connecting in series in order of circumferential arrangement a group of said coil bodies that are arranged alternately in a circumferential direction among a plurality of said coil bodies that constitute one of the first phase coil and second phase coil by connecting said first coil terminal of one coil body and said second coil terminal of another coil body; said three winding phase coils are configured by connecting together end portions of said coil terminals of said first phase coil and said second phase coil that extend in the first axial direction outward from identical radial positions in said slots axially outside said stator core so as to be radially outside a coil end group or axially outside said stator core so as to be radially inside said coil end group; and said coil terminals of said first phase coils of said three winding phase coils that constitute said three-phase winding comprise joint coil portions that comprise bent portions extending outward from said slots within a pitch of one magnetic pole in the first axial direction and extending, at an angle with respect to a radial direction, and are then bent so as to extend in a circumferential direction, and are placed in proximity to said end portions of said coil terminals of said second phase coils that are intended for connection therewith.

2. A rotary electric machine that includes the stator according to claim 1.

3. The stator according to claim 1, wherein said joint coil portions extend outward from said slots, and then extend in an opposite direction to a direction in which said coil terminals that extend outward from radial positions inside said slots that are identical to radial positions of said joint coil portions inside said slots extend circumferentially, and are connected to said coil terminals that are intended for connection therewith.

4. The stator according to claim 3, wherein said joint coil portions extend outward from said slots, and then extend rectilinearly, and are connected to said coil terminals that are intended for connection therewith.

5. The stator according to claim 1, wherein said joint coil portions extend outward from said slots, and then extend in an identical direction to a direction in which said coil terminals that extend outward from radial positions inside said slots that are identical to radial positions of said joint coil portions inside said slots extend circumferentially, and are connected to said coil terminals that are intended for connection therewith.

6. The stator according to claim 5, wherein said joint coil portions comprise a bent portion that displaces radially outward or radially inward at a portion that extends outward from said slots.

7. The stator according to claim 5, wherein said joint coil portions extend outward from said slots, and then extend rectilinearly, and are connected to said coil terminals that are intended for connection therewith.

* * * * *